US008467686B2

(12) United States Patent
Lonn (10) Patent No.: US 8,467,686 B2
(45) Date of Patent: Jun. 18, 2013

(54) COMBINED OPTICAL AND COAXIAL HUB FOR ROUTING AN UPSTREAM SIGNAL FROM A TWO-WAY DIGITAL OUTPUT TO AN EXISTING HYBRID FIBER COAX NETWORK

(75) Inventor: Robert S. Lonn, El Cajon, CA (US)

(73) Assignee: Cox Communications, Inc., Atlanta, GA (US)

( * ) Notice: Subject to any disclaimer, the term of this patent is extended or adjusted under 35 U.S.C. 154(b) by 358 days.

(21) Appl. No.: 12/824,937

(22) Filed: Jun. 28, 2010

(65) Prior Publication Data
US 2011/0318012 A1 Dec. 29, 2011

(51) Int. Cl.
*H04J 14/00* (2006.01)
*H04N 7/173* (2011.01)
(52) U.S. Cl.
USPC ............ 398/115; 398/116; 398/117; 398/66; 398/68; 398/67; 725/111; 725/129

(58) Field of Classification Search
USPC .................................... 398/115, 116
See application file for complete search history.

(56) References Cited

U.S. PATENT DOCUMENTS
2008/0124083 A1* 5/2008 Esser et al. ...................... 398/68

* cited by examiner

*Primary Examiner* — Shi K Li
*Assistant Examiner* — Oommen Jacob
(74) *Attorney, Agent, or Firm* — Merchant & Gould (57) ABSTRACT

A device for routing an upstream signal from a two-way digital output to an existing hybrid fiber coax network. A first path includes an input for receiving downstream optical signals associated with data and a two-way digital port for communicating the data of the downstream optical signals to a subscriber. A second path includes a hybrid fiber coax input and a two-way hybrid fiber coax port for communicating with the subscriber. A filter is disposed in the first path for routing an upstream signal from the subscriber at the two-way digital port to the second path for forwarding upstream via the hybrid fiber coax input.

19 Claims, 7 Drawing Sheets

COMBINED OPTICAL AND COAXIAL HUB FOR ROUTING AN UPSTREAM SIGNAL FROM A TWO-WAY DIGITAL OUTPUT TO AN EXISTING HYBRID FIBER COAX NETWORK

FIELD OF THE INVENTION

This disclosure relates in general to hybrid fiber coax networks, and more particularly to a combined optical and coaxial hub for routing an upstream signal from a two-way digital output to an existing hybrid fiber coax network.

BACKGROUND

Today, consumers are enjoying better value from broadband services as a result of the additional choices in a highly competitive multichannel video marketplace. Through these broadband services, consumers are experiencing higher quality programming and more advanced technology. Still, telecommunication companies continue to invest in deploying new broadband networks to provide interactive services for entertainment, communication and lifestyle applications.

While there are multiple network structures capable of supporting broadband services, providers of such networks continue to study how to integrate and take advantage of fiber optic network structures. As a result, an ever increasing percentage of broadband providers are investing in fiber optic network structures to support both present and future bandwidth requirements. For example, CATV (cable television), HDTV (high definition television), VoIP (voice over internet protocol), and broadband internet are some of the most common applications now being supported by fiber optic networks, in some cases directly to the home (FTTH—Fiber to the Home).

Competition is crucial for promoting consumer welfare and spurring innovation and investment in broadband access networks. Competition provides consumers the benefits of choice, better service and lower prices. This competition has induced broadband providers to invest in the above-mentioned network upgrades. Much of the population is able to choose from two providers for very high peak speeds (providers with fiber to the premises (FTTP) and DOCSIS 3.0 infrastructure). However, providers offering fiber-to-the-node (FTTN) and then DSL from the node to the premises, while potentially much faster than traditional DSL, may not be able to match the peak speeds offered by FTTP and DOCSIS 3.0. Accordingly, telephone companies have invested in deploying fiber to the home (FTTH).

The speeds of fiber optic and copper cables are both limited by length, but copper is much more sharply limited in this respect. Replacing at least part of the copper links in a network with fiber shortens the remaining copper segments and thereby allows the networks to run much faster. Fiber configurations that bring fiber right into the building can offer the highest speeds since the remaining segments can use standard Ethernet or coaxial cable. Fiber configurations that transition to copper in a street cabinet are generally too far from the users for standard Ethernet configurations over existing copper cabling. FTTH extends from the central office to the subscriber's living or working space. Once at the subscriber's living or working space, the signal may be conveyed throughout the space using any means, including twisted pair, coaxial cable, wireless, power line communication, or optical fiber.

There are two competing optical distribution network architectures. Active optical networks rely on electrically powered equipment to distribute the signal, such as a switch, router, or multiplexer. A passive optical network (PON) is a point-to-multipoint, fiber to the premises network architecture in which unpowered optical splitters are used to enable a single optical fiber to serve multiple premises. Once on private property, the signal typically travels the final distance to the end user's equipment using an electrical format.

While FTTH has its advantage with raw capacity, it suffers from high cost and technology limitations. Satellite has the advantage of providing all digital content and plenty of capacity. However, satellite also has a high infrastructure and CPE cost. Cable companies rely on hybrid fiber-coaxial (HFC), which combines optical fiber and coaxial cable. The fiber optic network extends from the headend of the cable operator network to a hub in a neighborhood, and finally to a fiber optic node that typically serves anywhere from 25 to 2000 homes.

To compete against the technologies of telephony companies and satellite television companies, cable companies need to capitalize on the advantages the HFC network while minimizing any disadvantages. If HFC can be leveraged to an entire customer base, customer loyalty will be maintained while preserving existing capital investment.

Accordingly, it can be seen that there is a need for a combined optical and coaxial hub for routing an upstream signal from a two-way digital output to an existing hybrid fiber coaxial network.

SUMMARY OF THE INVENTION

To overcome the limitations described above, and to overcome other limitations that will become apparent upon reading and understanding the present specification, embodiments for a combined optical and coaxial hub for routing an upstream signal from a two-way digital output to an existing hybrid fiber coax network are disclosed.

An embodiment includes a device for routing an upstream signal from a two-way digital output to an existing hybrid fiber coax network. The device includes a first path having an input for receiving downstream optical signals associated with data and a two-way digital port for communicating the data of the downstream optical signals to a subscriber and a second path having a hybrid fiber coax input and a two way hybrid fiber coax port for communicating with the subscriber, wherein the first path further comprises a filter disposed therein for routing an upstream signal from the subscriber at the two-way digital port to the second path for forwarding upstream via the hybrid fiber coax input.

In another embodiment, a communications system is provided. The communications system includes a hybrid fiber coax network for providing broadband communication services to subscribers, the hybrid fiber coax network comprising fiber optic cable extending from a headend to fiber optic nodes and coaxial cable extending from the fiber optic node to premises of the subscribers, the hybrid fiber coax segment providing a standard level of service to the subscribers, a fiber optic segment for providing fiber to the home of a subset of the subscribers subscribing to a premium level of service and a home interface device for routing an upstream signal from subscribers of the premium level of service to the hybrid fiber coax network, wherein the home interface device further includes a first path having an input for receiving downstream optical signals associated with data and a two-way digital port for communicating the data of the downstream optical signals to a subscriber and a second path having a hybrid fiber coax input and a two way hybrid fiber coax port for communicating with the subscriber, wherein the first path further comprises a filter disposed therein for routing an upstream signal from the subscriber at the two-way digital port to the second path for forwarding upstream via the hybrid fiber coax input.

In another embodiment, a method for routing an upstream signal from a two-way digital port to a hybrid fiber coax network is provided. The method includes receiving, from a headend of a network provider, a downstream fiber optic signal at an optical/coax hub located proximate to premises of a subscriber, receiving at the optical/coax hub, an upstream signal initiated by the customer and intended for routing to the headend of the network provider and transferring the upstream signal to a hybrid fiber coax network for transmission to the headend of the network provider.

These and various other advantages and features of novelty are pointed out with particularity in the claims annexed hereto and form a part hereof. However, for a better understanding of the disclosed embodiments, the advantages, and the objects obtained, reference should be made to the drawings which form a further part hereof, and to accompanying descriptive matter, in which there are illustrated and described specific examples of the disclosed embodiments.

BRIEF DESCRIPTION OF THE DRAWINGS

Referring now to the drawings in which like reference numbers represent corresponding parts throughout.

DETAILED DESCRIPTION

Embodiments of the present invention are directed to a combined optical and coaxial hub for routing an upstream signal from a two-way digital output to an existing hybrid fiber coax network. The two-way HFC network may be used to provide optical downstream and coax upstream. Accordingly, the 75% of the cost of the fiber optic network is not incurred because a two-way HFC network and the optical/coax hub eliminate the need.

Figure 1:
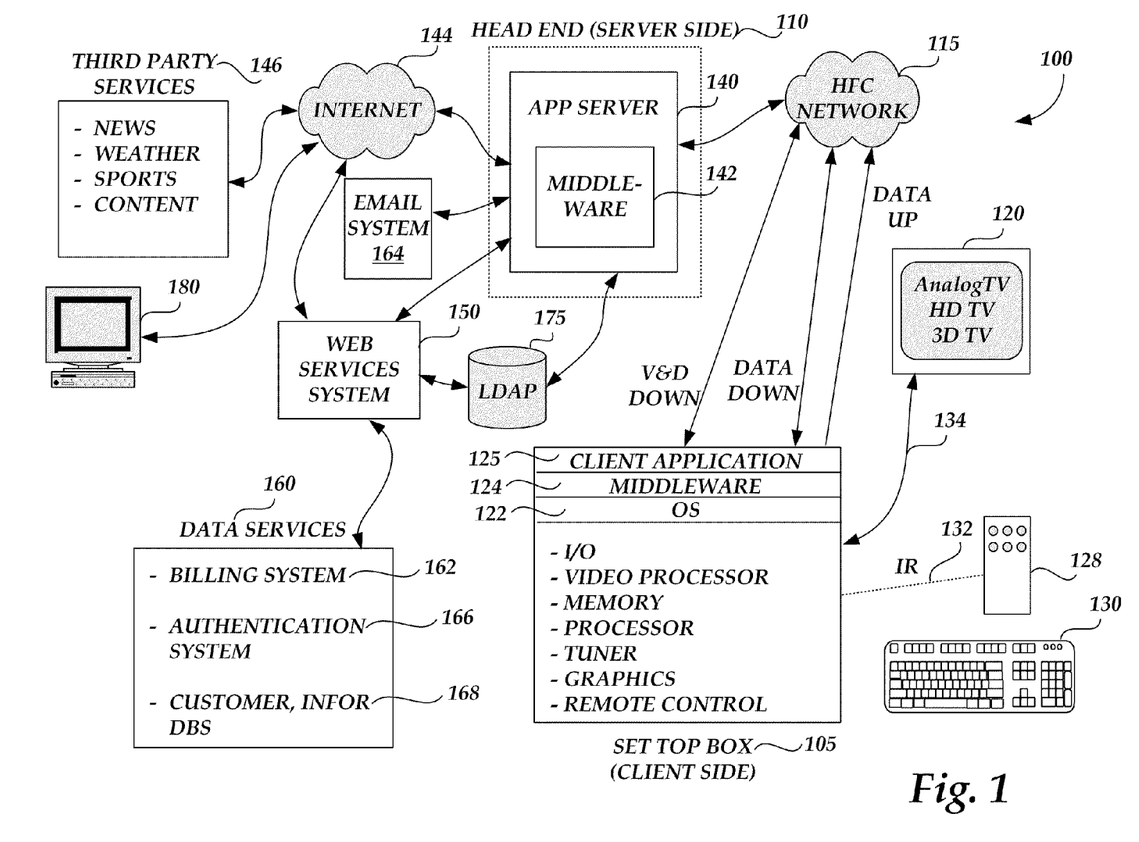
FIG. 1 is a simplified block diagram illustrating a cable television/services system architecture that serves as an exemplary operating environment for the present invention.

FIG. 1 is a simplified block diagram illustrating a cable television/services system 100 (hereafter referred to as "CATV") architecture that serves as an exemplary operating environment for the present invention. Referring now to FIG. 1, digital and analog video programming, information content and interactive television services are provided via a hybrid fiber coax (HFC) network 115 to a television set 120 for consumption by a cable television/services system customer. As is known to those skilled in the art, HFC networks 115 combine both optical fiber and coaxial cable lines. Typically, optical fiber runs from the cable head end 110 to neighborhoods of 500 to 2,000 customers. Coaxial cable runs from the optical fiber feeders to each customer. According to embodiments of the present invention, the functionality of the HFC network 115 allows for efficient bidirectional data flow between the client-side set-top box 105 and the server-side application server 140 of the present invention.

According to embodiments of the present invention, the CATV system 100 is in the form of a distributed client-server computing system for providing video and data flow across the HFC network 115 between server-side services providers (e.g., cable television/services providers) via a server-side head end 110 and a client-side customer via a client-side set-top box (STB) 105 functionally connected to a customer receiving device, such as the television set 120. As is understood by those skilled in the art, modem CATV systems 100 may provide a variety of services across the HFC network 115 including traditional digital and analog video programming, telephone services, high speed Internet access, video-on-demand, and information services.

On the client side of the CATV system 100, digital and analog video programming and digital and analog data are provided to the customer television set 120 via the set-top box (STB) 105. Interactive television services that allow a customer to input data to the CATV system 100 likewise are provided by the STB 105. As illustrated in FIG. 1, the STB 105 is a multipurpose computing device having a computer processor, memory and an input/output mechanism. The input/output mechanism receives input from server-side processes via the HFC network 115 and from customers via input devices such as the remote control device 128 and the keyboard 130. The remote control device 128 and the keyboard 130 may communicate with the STB 105 via a suitable communication transport such as the infrared connection 132. The remote control device 128 may include a biometric input module 129. The STB 105 also includes a video processor for processing and providing digital and analog video signaling to the television set 120 via a cable communication transport 134. A multi-channel tuner is provided for processing video and data to and from the STB 105 and the server-side head end system 110, described below.

The STB 105 also includes an operating system 122 for directing the functions of the STB 105 in conjunction with a variety of client applications 126. For example, if a client application 125 requires a news flash from a third-party news source to be displayed on the television 120, the operating system 122 may cause the graphics functionality and video processor of the STB 105, for example, to output the news flash to the television 120 at the direction of the client application 126 responsible for displaying news items.

Because a variety of different operating systems 122 may be utilized by a variety of different brands and types of set-top boxes, a middleware layer 124 is provided to allow a given software application to be executed by a variety of different operating systems. According to an embodiment of the present invention, the middleware layer 124 may include a set of application programming interfaces (API) that are exposed to client applications 126 and operating systems 122 that allow the client applications to communicate with the operating systems through common data calls understood via the API set. As described below, a corresponding middleware layer is included on the server side of the CATV system 100 for facilitating communication between the server-side application server and the client-side STB 105. According to one embodiment of the present invention, the middleware layer 142 of the server-side application server and the middleware layer 124 of the client-side STB 105 format data passed between the client side and server side according to the Extensible Markup Language (XML).

The set-top box 105 passes digital and analog video and data signaling to the television 120 via a one-way communication transport 134. The STB 105 may receive video and data from the server side of the CATV system 100 via the HFC network 115 through a video/data downlink and data via a data downlink. The STB 105 may transmit data from the client side of the CATV system 100 to the server side of the CATV system 100 via the HFC network 115 via one data uplink. The video/data downlink is an "in band" downlink that allows for digital and analog video and data signaling from the server side of the CATV system 100 through the HFC network 115 to the set-top box 105 for use by the STB 105 and for distribution to the television set 120. As is understood by those skilled in the art, the "in band" signaling space operates at a frequency between 54 and 860 megahertz. The signaling space between 54 and 860 megahertz is generally divided into 6 megahertz channels in which may be transmitted a single analog signal or a greater number (e.g., up to ten) digital signals.

The data downlink and the data uplink, illustrated in FIG. 1, between the HFC network 115 and the set-top box 105 comprise "out of band" data links. As is understand by those skilled in the art, the "out of band" frequency range generally lies between zero and 54 megahertz. According to embodiments of the present invention, data flow between the client-side set-top box 105 and the server-side application server 140 is typically passed through the "out of band" data links. Alternatively, an "in band" data carousel may be positioned in an "in band" channel into which a data feed may be processed from the server-side application server 140 through the HFC network 115 to the client-side STB 105. Operation of data transport between components of the CATV system 100, described with reference to FIG. 1, is well known to those skilled in the art.

Referring still to FIG. 1, the head end 110 of the CATV system 100 is positioned on the server side of the CATV system and includes hardware and software systems responsible for originating and managing content for distributing through the HFC network 115 to client-side STBs 105 for presentation to customers via televisions 120. As described above, a number of services may be provided by the CATV system 100, including digital and analog video programming, interactive television services, telephone services, video-on-demand services, targeted advertising, and provision of information content.

The application server 140 is a general-purpose computing system operative to assemble and manage data sent to and received from the client-side set-top box 105 via the HFC network 115. As described above with reference to the set-top box 105, the application server 140 includes a middleware layer 142 for processing and preparing data from the head end of the CATV system 100 for receipt and use by the client-side set-top box 105. For example, the application server 140 via the middleware layer 142 may obtain data from third-party services 146 via the Internet 140 for transmitting to a customer through the HFC network 115 and the set-top box 105. For example, a weather report from a third-party weather service may be downloaded by the application server via the Internet 144. When the application server 140 receives the downloaded weather report, the middleware layer 142 may be utilized to format the weather report for receipt and use by the set-top box 105.

According to one embodiment of the present invention, data obtained and managed by the middleware layer 142 of the application server 140 is formatted according to the Extensible Markup Language and is passed to the set-top box 105 through the HFC network 115 where the XML-formatted data may be utilized by a client application 126 in concert with the middleware layer 124, as described above. As should be appreciated by those skilled in the art, a variety of third-party services data, including news data, weather data, sports data and other information content may be obtained by the application server 140 via distributed computing environments such as the Internet 144 for provision to customers via the HFC network 115 and the set-top box 105.

According to embodiments of the present invention, the application server 140 obtains customer support services data, including billing data, information on customer work order status, answers to frequently asked questions, services provider contact information, and the like from data services 160 for provision to the customer via an interactive television session. As illustrated in FIG. 1, the services provider data services 160 include a number of services operated by the services provider of the CATV system 100 which may include data on a given customer.

A billing system 162 may include information such as a customer's name, street address, business identification number, Social Security number, credit history, and information regarding services and products subscribed to by the customer. According to embodiments of the present invention, the billing system 162 may also include billing data for services and products subscribed to by the customer for bill processing billing presentment and payment receipt.

A customer information database 168 may include general information about customers such as place of employment, business address, business telephone number and demographic information such as age, gender, educational level, and the like. The customer information database 168 may also include information on pending work orders for services or products ordered by the customer. The customer information database 168 may also include general customer information such as answers to frequently asked customer questions and contact information for various service provider offices/departments. As should be understood, this information may be stored in a variety of disparate databases operated by the cable services provider.

An electronic mail system 164 may contain information such as electronic mail addresses, high-speed Internet access subscription information and electronic mail usage data. An authentication system 166 may include information such as secure user names and passwords utilized by customers for access to network services. As should be understood by those skilled in the art, the disparate data services systems 162, 164, 166, 168 are illustrated as a collection of data services for purposes of example only. The example data services systems comprising the data services 160 may operate as separate data services systems, which communicate with a web services system (described below) along a number of different communication paths and according to a number of different communication protocols.

Referring still to FIG. 1, a web services system 150 is illustrated between the application server 140 and the data services 160. According to embodiments of the present invention, the web services system 150 serves as a collection point for data requested from each of the disparate data services systems comprising the data services 160. According to embodiments of the present invention, when the application server 140 requires customer services data from one or more of the data services 160, the application server 140 passes a data query to the web services system 150. The web services system formulates a data query to each of the available data services systems for obtaining any required data for a requesting customer as identified by a set-top box identification associated with the customer. The web services system 150 serves as an abstraction layer between the various data services systems and the application server 140. That is, the application server 140 is not required to communicate with the disparate data services systems, nor is the application server 140 required to understand the data structures or data types utilized by the disparate data services systems. The web services system 150 is operative to communicate with each of the disparate data services systems for obtaining necessary customer data. The customer data obtained by the web services system is assembled and is returned to the application server 140 for ultimate processing via the middleware layer 142, as described above.

Figure 2:
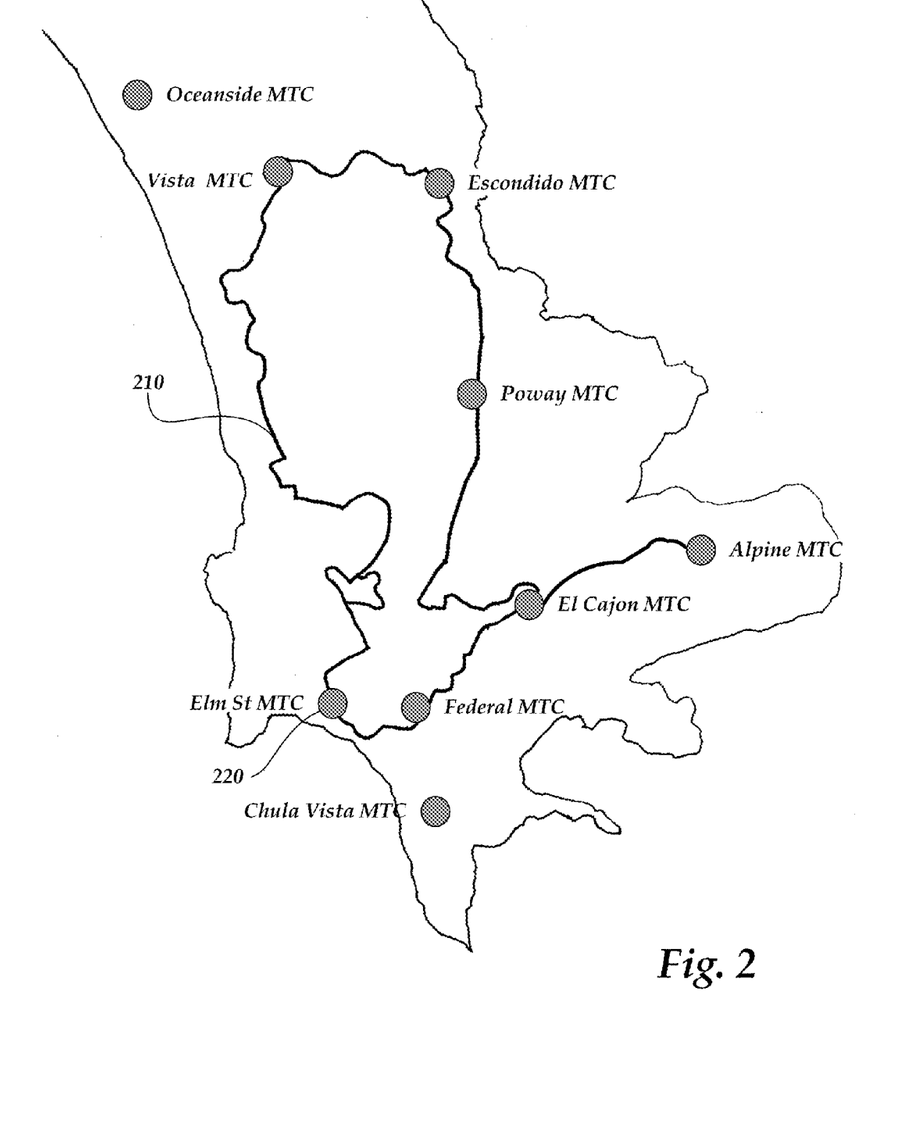
FIG. 2 illustrates a map of a HFC network according to an embodiment.

FIG. 2 illustrates a map 200 of a HFC network according to an embodiment. In FIG. 2, the HFC network uses fiber optic cable 210 to transport signals from the headend to fiber nodes, where signals are provided to subscriber premises. Bandwidth is what makes the digital services possible. For all the advantages of digital transmission, it requires tremendous capacity to carry all of this information. The fiber optic cable 210 provides the needed bandwidth. HFC offers a means of delivering video, voice telephony, data and other interactive services over the fiber optic cable 210 and coaxial cables for the last portion of the path to the subscriber's home. Moreover, interactive TV relies on a two-way link between the subscriber and the cable network.

Master Telecommunications Centers (MTCs) 220 are placed in a service area to deploy fiber to support high-speed data, video, and voice service provisioning and delivery to residences and businesses. MTCs 220 are also referred to as master headends (MHe), headends (HE), etc. From the MTCs, a supertrunk is used to distribute broadband signals to local hubs. From the hubs, the broadband signal is sent out to the distribution network. Coaxial cable may be used to provide the signals to the subscriber's homes.

The network represents a substantial investment that cost into the billions of dollars. Accordingly, network providers do not want to simply scrap all the components in their existing network as deploy more fiber optic cables. The optical/coax hub according to an embodiment allows all of the investment in HFC to be used, while simultaneously investing in laying fiber.

Existing HFC works really well for a large percentage of customers. However, premium customers are more profitable and are willing to pay more for more services, i.e., more channels, faster high speed Internet speed, etc. As a consequence, companies are moving to deploy fiber optic cable further toward the customer. A large percentage of customers are willing, or demanding, for the additional services that optical fiber can provide.

When cable fiber optic is installed on a street, taps are distributed along the path. For example, for a traditional cable line, tap devices are distributed along poles if the cable is overhead cable, or at a pedestal if the cable runs underground. Taps for fiber optics may also be built. Rather than considering reclaiming some fiber for higher end uses, such as businesses, an optical/coax hub may be used to leverage the investment in fiber cable.

Figure 3:
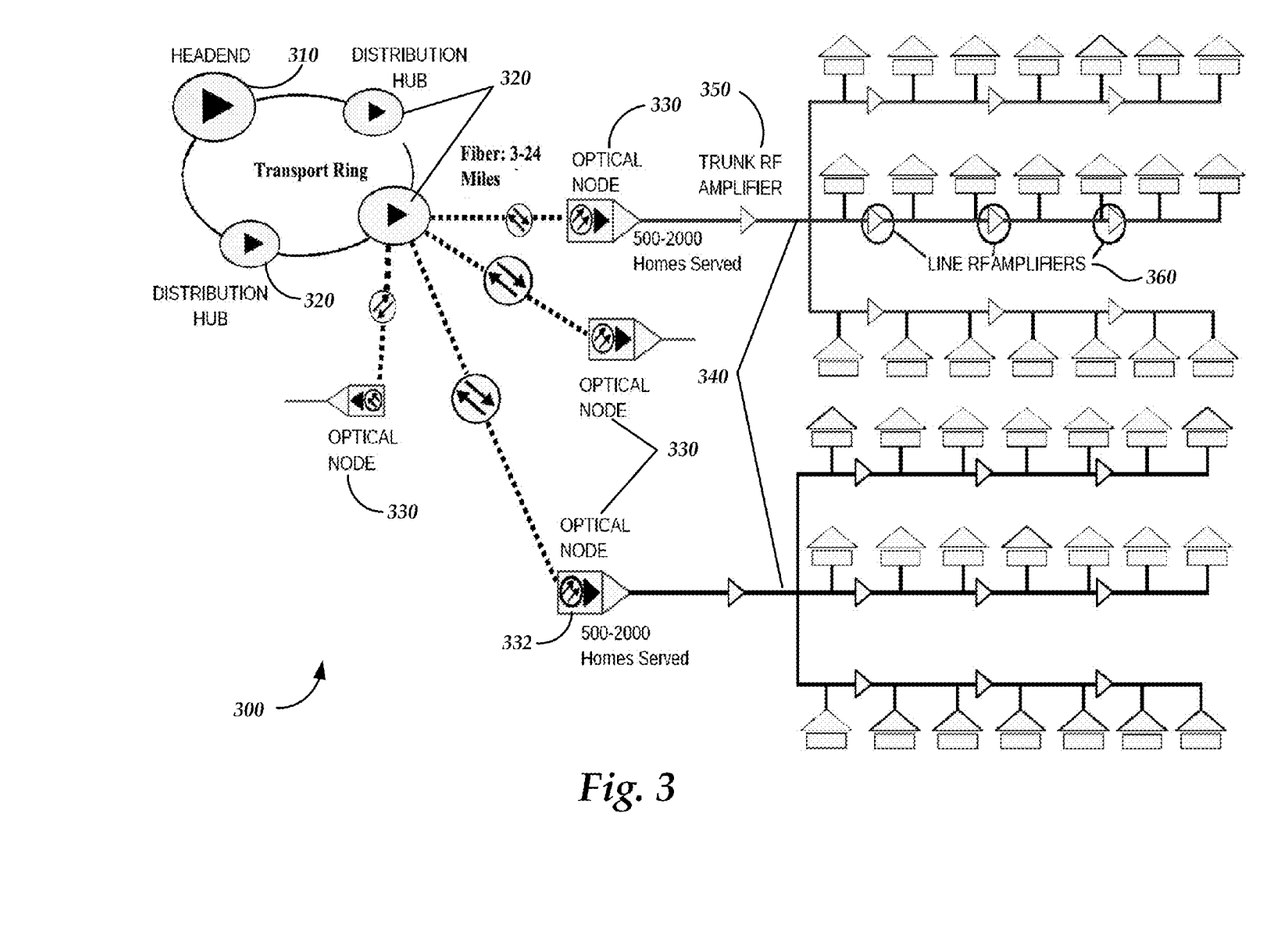
FIG. 3 illustrates a hybrid fiber coax network according to an embodiment.

FIG. 3 illustrates a hybrid fiber coax network 300 according to an embodiment. The fiber optic network 300 extends from the headend 310 of cable operator network to a distribution hub 320, and then to a fiber optic node 330 that may serve 25 to 2000 homes. Various services are encoded, modulated and upconverted onto RF carriers, where they are combined onto a single electrical signal and inserted into a broadband optical transmitter at the headend 310. This optical transmitter converts the electrical signal to a downstream optically modulated signal that is sent to the distribution hubs 320. Fiber optic cables connect the distribution hub 320 to optical nodes 330 in a point-to-point or star topology, or in some cases, in a protected ring topology.

A fiber optic node 330 has a broadband optical transceiver 332 which converts the downstream optically modulated signal coming from the headend 310 and distribution hub 320 to an electrical signal going to the homes 340. The transceiver 332 of fiber optic node 330 also provides a reverse/return path for sending communication from the home 340 back to the headend 310. The optical portion of the network provides a large amount of flexibility. Wavelength division multiplexing can be used to combine multiple optical signals onto the same fiber. There are also techniques to put multiple downstream and upstream signals on a single fiber by putting them at different wavelengths.

The coaxial portion of the network may connect 25 to 2000 homes 340. For example, the homes 340 may be coupled to the coaxial network in a tree-and-branch configuration off of nodes 330. Trunk amplifiers 350 may be positioned after the nodes 330 to correct for any attenuation. Trunk coaxial cables 370 may be connected to the optical node and form coaxial backbones to which smaller distribution cables connect. Trunk cables 370 may also carry AC power that may be added to the cable line by a power supply and a power inserter.

From the trunk cables 370, smaller distribution cables are connected to a port of the trunk amplifier to carry the RF signal and the AC power down individual streets. If needed, line extenders, which are smaller distribution amplifiers, boost the signals to keep the power of the television signal at a level that a television can accept. RF amplifiers 360 may be placed at intervals to overcome cable attenuation and passive losses of the electrical signals caused by splitting or "tapping" the coaxial cable. The distribution line is then "tapped" into and used to connect the individual drops to customer homes. The tap terminates into a small coaxial drop and the drop is then connected to the homes 340.

Accordingly, hybrid fiber coax (HFC) network 300 is used in the vast majority of the cable TV industry as the line that provides signals to homes 340 of subscribers. However, communications companies, in particular cable companies, have invested in laying fiber optic cables.

Figure 4:
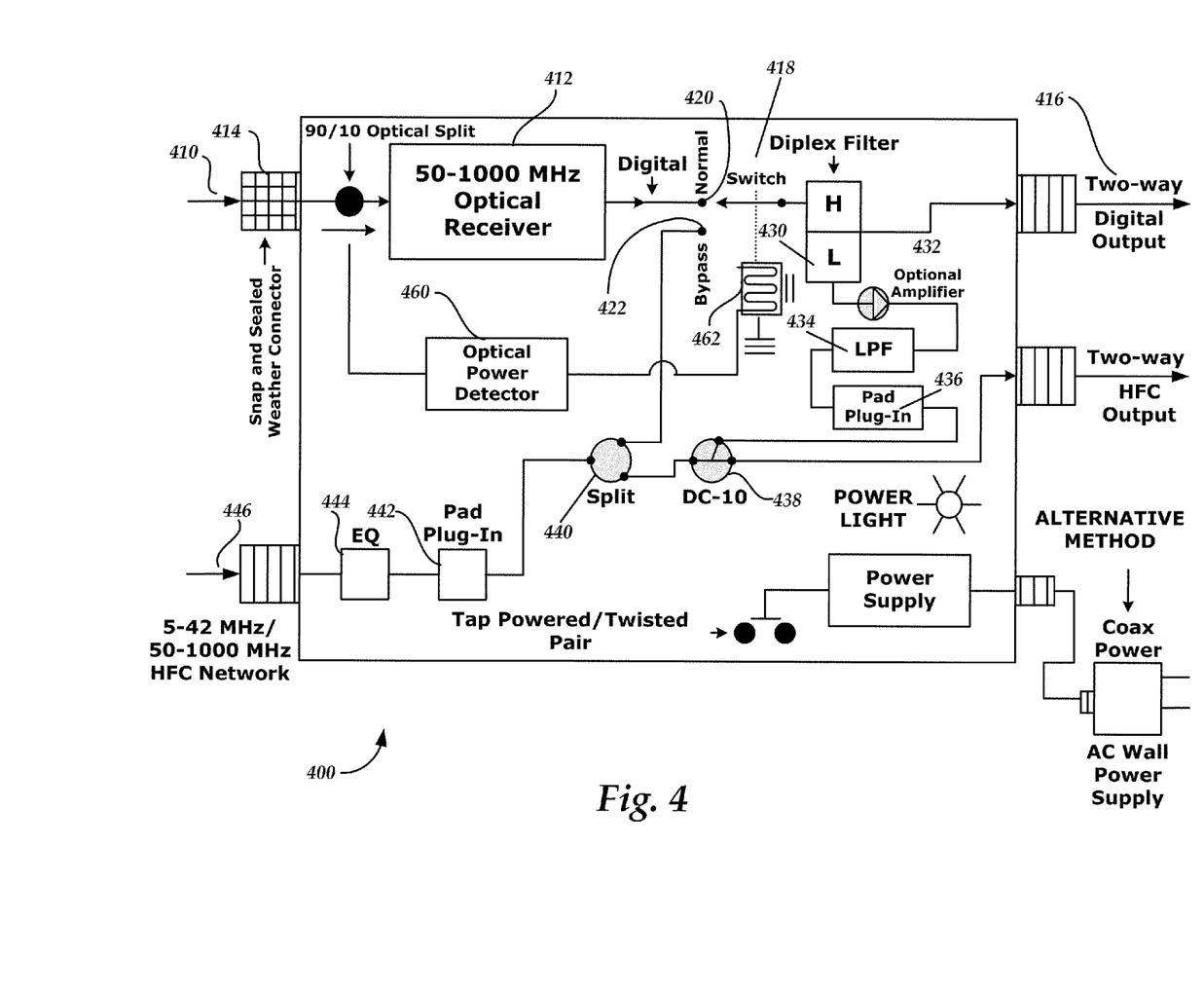
FIG. 4 illustrates a combined optical and coaxial hub for routing an upstream signal from a two-way digital output to an existing hybrid fiber coax network according to an embodiment of the invention.

FIG. 4 illustrates an optical/coax hub 400 according to an embodiment of the invention. The optical/coax hub is configured to leverage the existing fiber. Typically, the spectrum for the HFC is 5-1000 MHz and it is used for delivering downstream and upstream signals. Signals are delivered from a main telecommunications facility to the fiber node by fiber optics. Once the signal reaches the neighborhood, e.g., 1000 homes, the optical signals are converted back to coaxial cable that is used to deliver the signal to the neighborhood, then to the home and ultimately to s set top converter box (STCB or STB) or the back of the television.

When considering providing fiber to a home, the cost of delivering signals between the home and the headend must be taken into consideration. A quarter of the cost of a fiber optic network is traceable to providing the signal downstream to the home. The remaining portion of the costs, 75%, occurs when the customer is using a cable modem, ordering a video on demand movie or using a telephone service that needs to use the cable provider network to provide upstream signals. Such signals may include the signal that is generated when the remote is used to pause a pay-per-view (PPV) movie.

In FIG. 4, a fiber optic cable 410 comes into the optical/coax hub 400 and is received by an optical receiver 412. A weather connector 414 may be used to protect the port against the elements. As discussed above, 25% of the cost of a fiber optic network is traceable to delivering all the downstream signals to the home. The signal from the optical receiver 412 is provided to switch 418. The switch is in the normal position 420 and the signal passes to the two-way digital output 416. An optical power detector 460 monitors the optical signal input 410 to power an actuator 462 for controlling switch 418. When the optical power detector 460 detects that there is no optical signal at optical signal input 410, the optical power detector 460 causes actuator 462 to change the state of switch 418 to the bypass position 422.

A signal may also be received at port 446 labeled 5-42 MHz/50-1000 MHz HFC network. The signal may be fed to the equalizer 444 and to the pad plug-in 442. From there the signal may proceed to splitter 440, coupler 438 and finally to the two-way HFC output 422. The two-way HFC output 422 may also provide a signal in the reverse direction to port 446 labeled 5-42 MHz/50-1000 MHz HFC network.

However, the optical/coax hub according to an embodiment of the invention provides upstream signals, e.g., from two-way digital output 416, back upstream to the headend. The signal passes from two-way digital output 416 to the L diplex filter 434. The diplex filter 430, L, receives the upstream signal and sends the upstream signal to an operational amplifier 432, a low pass filter 434, a pad plug-in 436, a directional coupler 438 and then feeds to the splitter 440. At the splitter 440, the signal may feed to the pad plug-in 442, the equalizer 444 and to the port 446 labeled 5-42 MHz/50-1000 MHz HFC network.

Accordingly, the upstream signal from two-way digital output 416 has been transferred to the existing HFC network. A new downstream fiber optic delivers digital signals to the home, but the existing HFC network is used to deliver the upstream signal. Thus, the cable company or other communications network provider does not have to build the upstream network. Thus, the two-way HFC network may provide optical downstream and coax upstream. Accordingly, the 75% of the cost of the fiber optic network is not incurred because a two-way HFC network and the optical/coax hub 400 eliminate the need.

As a result, fiber optics does not have to be built to the home of every single customer. Rather, fiber only has to be provided to the houses that require advanced services. The optical/coax hub 400 may be placed on line and now high definition channels can be provided simultaneously to every television in the house. The limiting parameter is the optical receiver 412. As optical receivers 412 advance, however, additional channels may be provided by using the more advanced optical receivers 412. Alternatively, the current technology may be used, but instead of a single optical receiver 412, multiple optical receivers 412 may be included in the optical/coax hub 400. In this scenario, a single fiber comes in that uses multiple, different wavelengths.

For example, with two different wavelengths, the number of channels may be doubled. The optical/coax hub may be configured to support the use of 32 different wavelengths on a single fiber, which translates into over 8000 simultaneous high definition channels if the necessary optical receivers are also implemented. Thus, if a customer had 8000 television sets in their house, they could watch a different program on every single one of those TV sets at the same time. On the headend of the network, additional transmitters, couplers, etc. would have to be used to transmit that many wavelengths. However, the infrastructure, i.e., the fiber optic network already exists. Only additional electronics need be installed in the cable plant.

Figure 5:
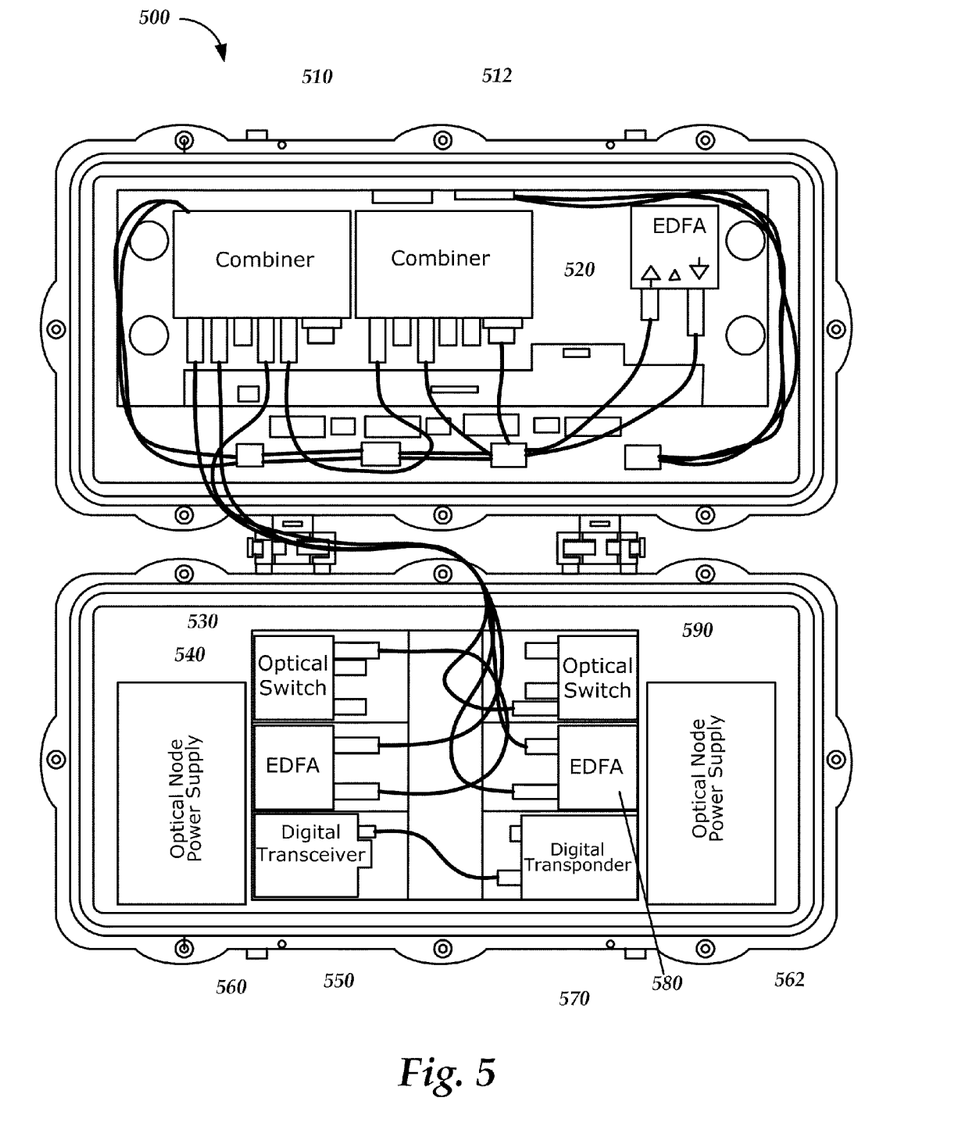
FIG. 5 illustrates a combined optical and coaxial hub for routing an upstream signal from a two-way digital output to an existing hybrid fiber coax network according to an embodiment of the invention.

FIG. 5 illustrates a combined optical and coaxial hub for routing an upstream signal from a two-way digital output to an existing hybrid fiber coax network according to an embodiment of the invention. The fiber hub includes two combiners 510, 512, EDFA (Erbium Doped Fiber Amplifier) modules 520, 540, 580, optical switches 530, 590, digital transceiver 550, digital transponder 570, and optical node power supplies 560, 562. The fiber hub 500 provides the downstream signal to the homes of customers. The fiber optic network is separate from the HFC network, but both are implemented as a single cohesive system. Moreover, the implementation of this single cohesive system, as described above with reference to FIG. 4, provides a 75% cost savings compared to building a true two-way fiber optic network.

Figure 6:
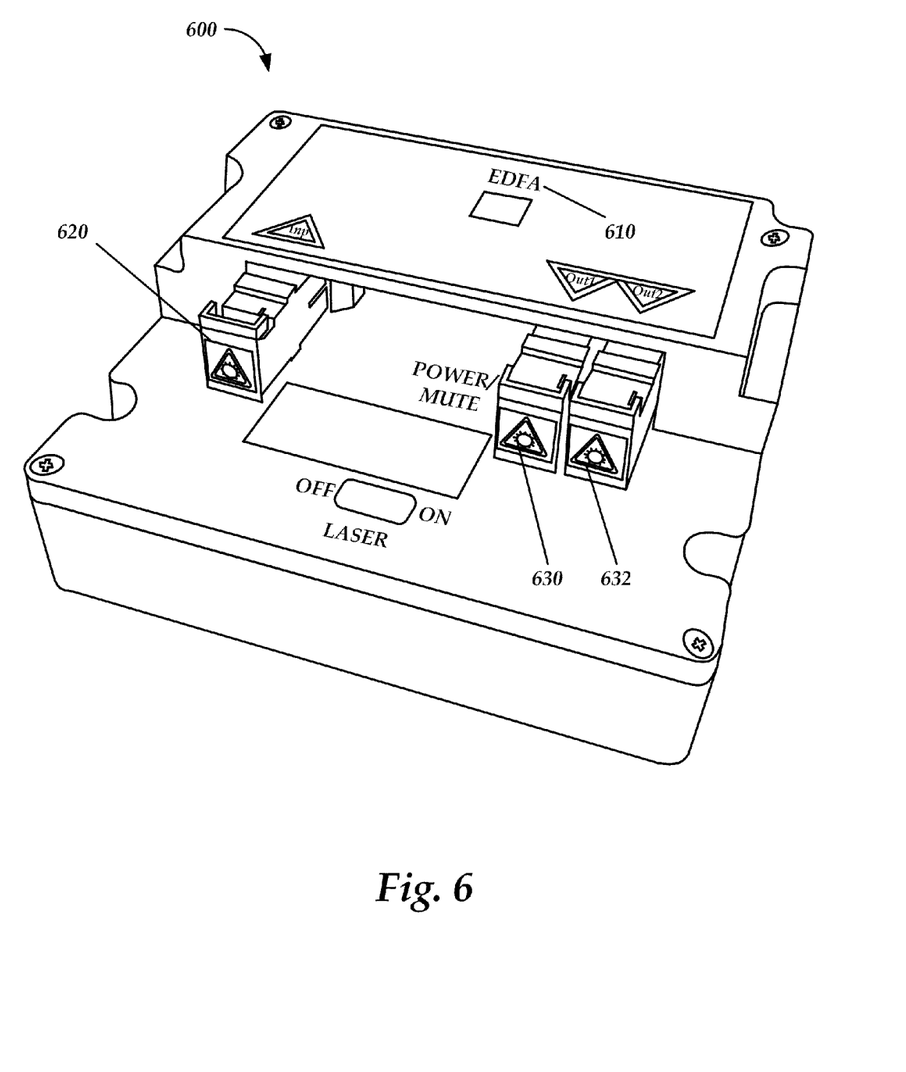
FIG. 6 illustrates an optical amplifier according to an embodiment of the invention.

FIG. 6 illustrates an optical amplifier 600 according to an embodiment of the invention. Optical amplifier 600 is labeled as an EDFA (Erbium Doped Fiber Amplifier) module 610. The optical amplifier 600 directly amplifies the optical signal carrying the service provider content without the need to first convert it to an electrical signal. Individual fiber amplifier modules are provided for the optical amplifier 600. Fiber input amplifier module 620 is attached to the housing of the optical amplifier 600. Fiber output amplifier modules 630, 632 are also is attached to the housing of the optical amplifier 600. Fiber connectors attach to the Individual fiber amplifier modules 620, 630, 632 as shown with amplifiers modules 520, 540, 580 in FIG. 5. Compact fiber amplifier modules 620, 630, 632 contain not only the actual fiber amplifiers, but also the control electronics for the pump diodes, and possibly extras such as an input and/or output power monitor, power stabilization, alarms, gain-flattening filters, etc. The amplification window of the optical amplifier 600 is the range of optical wavelengths for which the amplifier yields a usable gain.

Figure 7:
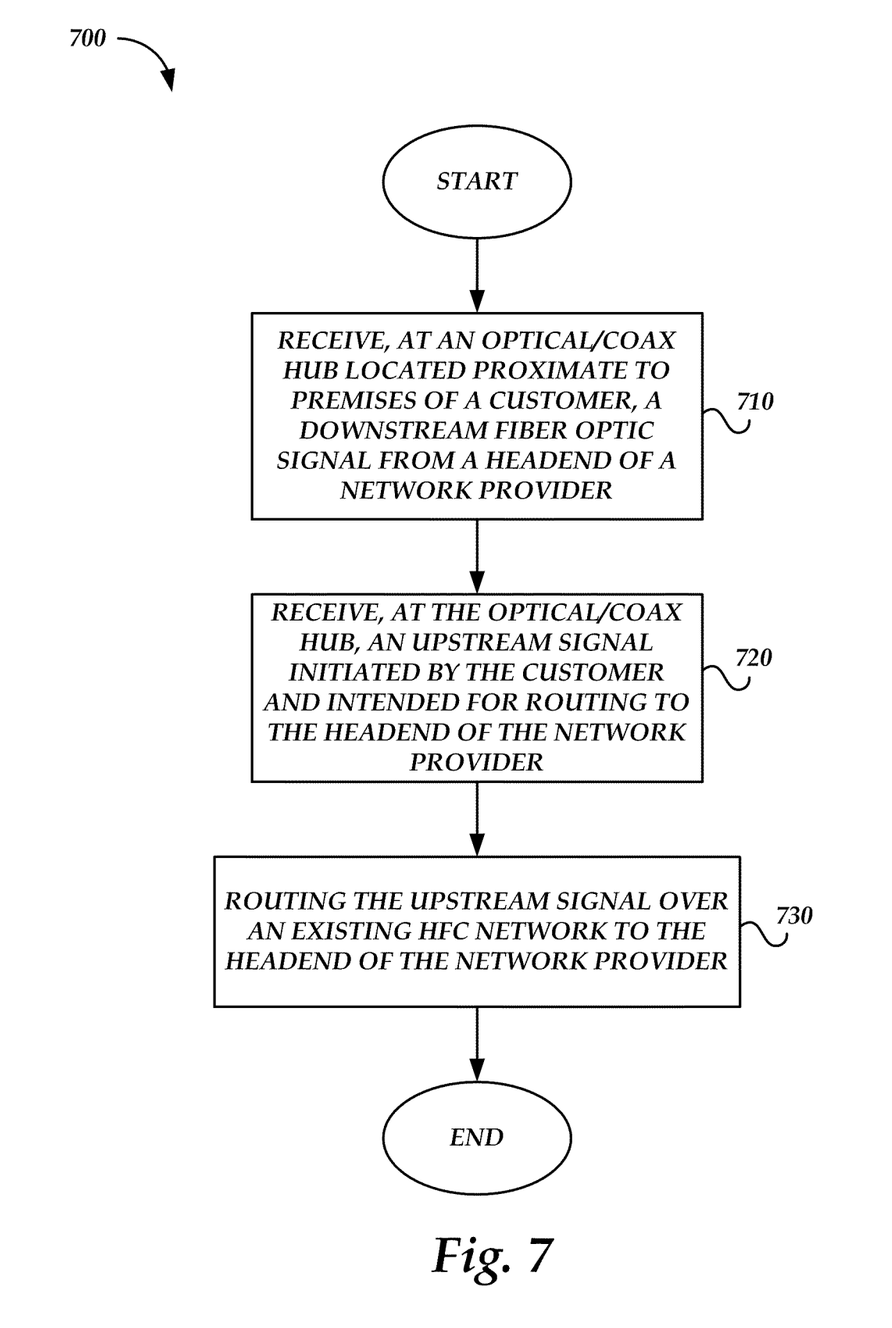
FIG. 7 is a flow chart for providing an optical/coax amplifier according to an embodiment of the invention.

FIG. 7 is a flow chart 700 for providing an optical/coax amplifier according to an embodiment of the invention. In FIG. 7, a downstream fiber optic signal is received at an optical/coax hub located proximate to premises of a customer from a headend of a network provider 710. At the optical/coax hub, an upstream signal initiated by the customer and intended for routing to the headend of the network provider is received 720. The upstream signal is routed over an existing HFC network to the headend of the network provider 730.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A device for routing an upstream signal from a two-way digital output to an existing hybrid fiber coax network, comprising:
   a first path having an input for receiving downstream optical signals associated with data and a two-way digital port for communicating the data of the downstream optical signals to a subscriber; and
   a second path having a hybrid fiber coax input and a two way hybrid fiber coax port for communicating with the subscriber;
   wherein the first path further comprises a filter disposed therein for routing an upstream signal from the subscriber at the two-way digital port to the second path for forwarding upstream via the hybrid fiber coax input.

2. The device of claim 1, wherein the first path includes an optical receiver disposed between the input for receiving downstream optical signals and the filter, the optical receiver converting the data of the downstream optical signals to downstream RF digital signals for provisioning to the subscriber via the two-way digital port.

3. The device of claim 2, wherein the filter comprises a diplex filter configured to separate the upstream signal from the downstream RF signal.

4. The device of claim 1 further comprising an optical amplifier coupled to the filter for setting an amplitude for the upstream signal and a low pass filter coupled to the optical amplifier for filtering the upstream signal.

5. The device of claim 4, wherein the second path further includes a directional coupler for receiving the filtered upstream signal from the low pass filter and coupling the upstream signal onto the second path for transmission via the hybrid fiber coax input.

6. The device of claim 5 further comprising an equalizer disposed between the hybrid fiber coax input and the directional coupler.

7. The device of claim 1, wherein the second path further includes a splitter disposed therein for splitting a signal from the hybrid fiber coax input, and wherein the first path includes a switch disposed between the input for receiving the downstream optical signals and the filter, the switch being selectable to provide the signal from the hybrid fiber coax input and the splitter to the two-way digital port or to provide the data of the downstream optical signals to the two-way digital port.

8. The device of claim 7 further comprising an optical power detector for monitoring the input for receiving the downstream optical signals to power an actuator for controlling the switch, wherein the optical power detector causes the actuator to change the state of the switch to a bypass position for receiving the signal from the hybrid fiber coax input and the splitter when the optical power detector determines there is no optical signal at the input for receiving the downstream optical signals.

9. The device of claim 1 further comprising an optical amplifier coupled to the filter for setting an amplitude for the upstream signal and a low pass filter coupled to the optical amplifier for filtering the upstream signal, wherein the second path further includes a directional coupler for receiving the filtered upstream signal from the low pass filter and coupling the upstream signal onto the second path for transmission via the hybrid fiber coax input, wherein the first path includes at least one optical receiver disposed between the input for receiving the downstream optical signals and the filter, the at least one optical receiver converting the data of the downstream optical signals to downstream RF digital signals for provisioning to the subscriber via the two-way digital port, and wherein the filter comprises a diplex filter configured to separate the upstream signal from the downstream RF signal.

10. The device of claim 9 further comprising an equalizer disposed between the hybrid fiber coax input and the directional coupler.

11. The device of claim 9, wherein the second path further includes a splitter disposed therein for splitting a signal from the hybrid fiber coax input, and wherein the first path includes a switch disposed between the at least one optical receiver and the diplex filter, the switch being selectable to provide the signal from the hybrid fiber coax input and the splitter to the two-way digital port or to provide the downstream RF digital signals to the two-way digital port.

12. The device of claim 11 further comprising an optical power detector for monitoring the input for receiving the downstream optical signals to power an actuator for controlling the switch, wherein the optical power detector causes the actuator to change the state of the switch to a bypass position for receiving the signal from the hybrid fiber coax input and the splitter when the optical power detector determines there is no optical signal at the input for receiving the downstream optical signals.

13. The device of claim 9, wherein the at least one optical receiver further comprises a plurality of optical receivers to expand a number of wavelengths that may be processed thereby expanding a number of channels provided to the subscriber.

14. A communications system, comprising:
a hybrid fiber coax network for providing broadband communication services to subscribers, the hybrid fiber coax network comprising fiber optic cable extending from a headend to fiber optic nodes and coaxial cable extending from the fiber optic node to premises of the subscribers, the hybrid fiber coax segment providing a standard level of service to the subscribers;
a fiber optic segment for providing fiber to the home of a subset of the subscribers subscribing to a premium level of service; and
a home interface device for routing an upstream signal from the subscribers of the premium level of service to the hybrid fiber coax network, wherein the home interface device further comprises:
a first path having an input for receiving downstream optical signals associated with data and a two-way digital port for communicating the data of the downstream optical signals to a subscriber; and
a second path having a hybrid fiber coax input and a two way hybrid fiber coax port for communicating with the subscriber;
wherein the first path further comprises a filter disposed therein for routing an upstream signal from the subscriber at the two-way digital port to the second path for forwarding upstream via the hybrid fiber coax input.

15. The communications system of claim 14, wherein the first path includes an optical receiver disposed between the input for receiving the downstream optical signals and the filter, the optical receiver converting the data of the downstream optical signals to downstream RF digital signals for provisioning to the subscriber via the two-way digital port.

16. The communications system of claim 15, wherein the filter comprises a diplex filter configured to separate the upstream signal from the downstream RF signal.

17. The communications system of claim 14 further comprising an optical amplifier coupled to the filter for setting an amplitude for the upstream signal and a low pass filter coupled to the optical amplifier for filtering the upstream signal.

18. The communications system of claim 17, wherein the second path further includes a directional coupler for receiving the filtered upstream signal from the low pass filter and coupling the upstream signal onto the second path for transmission via the hybrid fiber coax input.

19. The communications system of claim 14, wherein the second path further includes a splitter disposed therein for splitting a signal from the hybrid fiber coax input, and wherein the first path includes a switch disposed between the input for receiving the downstream optical signals and the filter, the switch being selectable to provide the signal from the hybrid fiber coax input and the splitter to the two-way digital port or to provide the data of the downstream optical signals to the two-way digital port.

\* \* \* \* \*